US008301195B2

(12) United States Patent
Warren et al.

(10) Patent No.: US 8,301,195 B2
(45) Date of Patent: Oct. 30, 2012

(54) SYSTEMS AND METHODS FOR MOBILE DATA STORAGE AND ACQUISITION

(75) Inventors: Robert W. Warren, Loveland, CO (US); Stephen N. Haddad, Longmont, CO (US); Fadi Afa Al-Refaee, Irvine, CA (US); Nikolai K. Bahram, Scotts Valley, CA (US)

(73) Assignee: Agere Systems Inc., Allentown, PA (US)

( * ) Notice: Subject to any disclaimer, the term of this patent is extended or adjusted under 35 U.S.C. 154(b) by 583 days.

(21) Appl. No.: 12/280,787

(22) PCT Filed: Jun. 25, 2007

(86) PCT No.: PCT/US2007/072008
§ 371 (c)(1),
(2), (4) Date: Aug. 26, 2008

(87) PCT Pub. No.: WO2008/005734
PCT Pub. Date: Jan. 10, 2008

(65) Prior Publication Data
US 2009/0176529 A1    Jul. 9, 2009

Related U.S. Application Data

(60) Provisional application No. 60/806,610, filed on Jul. 5, 2006, provisional application No. 60/829,007, filed on Oct. 11, 2006, provisional application No. 60/869,453, filed on Dec. 11, 2006.

(51) Int. Cl.
*H04B 1/38* (2006.01)

(52) U.S. Cl. .................... 455/557; 455/558; 455/420

(58) Field of Classification Search .................. 455/557, 455/558, 420
See application file for complete search history.

(56) References Cited

U.S. PATENT DOCUMENTS 6,625,157 B2   9/2003   Niu et al.
6,763,226 B1   7/2004   McZeal
(Continued)

FOREIGN PATENT DOCUMENTS
JP         2002/223485         8/2002
(Continued)

OTHER PUBLICATIONS

Want, Roy et al "The Personal Server: Changing the Way We Think about Ubiquitous Computing" Retrieved from the Internet: URL: citeseerx.ist.psu.edu. [retrieved Jul. 26, 2012].

*Primary Examiner* — Barry Taylor
(74) *Attorney, Agent, or Firm* — Hamilton, DeSanctis & Cha

(57) ABSTRACT

Various data acquisition, storage and/or distribution systems and devices are described herein. As one example, a mobile data acquisition and distribution device is described. The device includes a non-volatile storage medium, a wireless interface, and a processor. The non-volatile storage medium includes instructions executable by the processor to: receive a user data set, and to store the user data set to the non-volatile storage medium. The instructions are further executable by the processor to receive a request initiated through a remote user interface via the wireless interface. Where the request is to provide the user data set to a recipient device, the instructions are further executable by the processor to provide the user data set to the recipient device via the wireless interface.

25 Claims, 9 Drawing Sheets

U.S. PATENT DOCUMENTS

| | | |
|---|---|---|
| 7,058,734 B2 | 6/2006 | Chen et al. |
| 7,386,672 B2 | 6/2008 | Casazza |
| 7,523,262 B2 | 4/2009 | Casazza |
| 7,924,825 B2 * | 4/2011 | Dowling et al. ............... 370/356 |
| 2001/0034714 A1 | 10/2001 | Terao et al. |
| 2002/0116575 A1 | 8/2002 | Toyomura et al. |
| 2002/0184318 A1 | 12/2002 | Pineau |
| 2003/0110484 A1 | 6/2003 | Famolari |
| 2003/0216136 A1 | 11/2003 | Mcbrearty et al. |
| 2004/0044725 A1 | 3/2004 | Bell et al. |
| 2004/0110468 A1 | 6/2004 | Perlman |
| 2004/0177128 A1 | 9/2004 | Northway |
| 2004/0204063 A1 | 10/2004 | Van Erlach |
| 2004/0219946 A1 | 11/2004 | Yassa |
| 2005/0021418 A1 | 1/2005 | Marcus et al. |
| 2005/0050371 A1 * | 3/2005 | Ono ............................... 713/300 |
| 2005/0073522 A1 | 4/2005 | Aholainen |
| 2005/0107120 A1 | 5/2005 | Yueh |
| 2005/0129385 A1 * | 6/2005 | Speasl et al. .................... 386/46 |
| 2005/0182858 A1 * | 8/2005 | Lo et al. ........................... 710/1 |
| 2005/0210101 A1 | 9/2005 | Janik |
| 2005/0210120 A1 | 9/2005 | Yukie |
| 2005/0289216 A1 | 12/2005 | Myka et al. |
| 2006/0026348 A1 * | 2/2006 | Wallace et al. ................ 711/115 |
| 2006/0059094 A1 | 3/2006 | Oh et al. |
| 2007/0128899 A1 | 6/2007 | Mayer |
| 2007/0184899 A1 * | 8/2007 | Rantapuska ..................... 463/30 |

FOREIGN PATENT DOCUMENTS

| | | |
|---|---|---|
| JP | 2003/153163 | 5/2003 |
| JP | 2004/106801 | 4/2004 |
| WO | WO 2005/081456 | 9/2005 |

* cited by examiner

SYSTEMS AND METHODS FOR MOBILE DATA STORAGE AND ACQUISITION

CROSS REFERENCE TO RELATED APPLICATIONS

The present application claims priority to (is a non-provisional filing of) U.S. Provisional Patent Application No. 60/806,610, entitled "SYSTEMS AND METHODS FOR MOBILE DATA STORAGE AND ACQUISITION" and filed Jul. 5, 2006 by Al-Refaee et al.; U.S. Provisional Patent Application No. 60/829,007, entitled "SYSTEMS AND METHODS FOR MOBILE DATA STORAGE AND ACQUISITION" and filed Oct. 11, 2006 by Al-Refaee et al.; and U.S. Provisional Patent Application No. 60/869,453, entitled "SYSTEMS AND METHODS FOR MOBILE DATA STORAGE AND ACQUISITION" and filed Dec. 11, 2006 by Al-Refaee et al. Each of the aforementioned applications is assigned to an entity common hereto and is incorporated herein by reference for all purposes.

Further, the present application is related to the following patent applications filed on a date even herewith: PCT Application No. PCT/US07/71989, entitled "Systems and Methods for Implementing Hands Free Operational Environments" and filed by Bahram et al.; PCT Application No. PCT/US07/71991, entitled "Systems and Methods for Multiport Communication Distribution" and filed by Haddad et al.; PCT Application No. PCT/US07/71994, entitled "Systems and Methods for Power Management in Relation to a Wireless Storage Device" and filed by Warren et al.; PCT Application No. PCT/US07/72000, entitled "Systems and Methods for Enabling Consumption of Copy-Protected Content Across Multiple Devices" and filed by Al-Refaee et al.; and PCT Application No. PCT/US07/72003, entitled "Systems and Methods for Multi-user Access to a Wireless Storage Device" and filed by Al-Refaee et al. All of the aforementioned related applications are assigned to an entity common hereto and are incorporated herein by reference for all purposes.

BACKGROUND OF THE INVENTION

The present invention is generally related to devices and methods for distributing data, and in particular to systems and methods for storing and distributing data in a wireless mobile environment.

The computer architecture with a central processor governing a local data repository has been a standard in computing for decades. The architecture utilizes a central repository that is perceived as a slave to an associated processor. The processor governs the central repository by commanding storage and retrieval of information from the central storage on demand. This architecture has been modified over the decades to increase accessibility by the governing processor by, for example, providing separate instruction and data repositories and providing sophisticated caching and other hierarchical access schemes. Other more dramatic changes have included adding separately accessed memories for specialized functions such as, for example, the graphics function in a personal computer. While these changes have aided in throughput, the integrity of the standard architecture with a data depository maintained on demand of a central processor has been maintained.

A myriad of devices utilizing the familiar processor and memory structure have been developed. For example, a number of application devices including audio recorders, audio players, cellular telephones, video players, video game devices, video recorders and the like have been developed that include a central memory local to the particular device and operating as a slave to a governing processor within the device. Such devices have proliferated in the market and have satisfied a continuing consumer demand. However, the growth of digital rights management has exposed various limitations of a data repository governed by a local processor. In particular, digital content providers are willing to sell content to consumers and allow the consumers to maintain and use the content for as long as the consumer desires. This promise, however, has proven to be somewhat illusory as digital rights management often limits the use of purchased content to a device on which the content was originally deployed. Thus, for example, a consumer may purchase a particular ring tone from a content provider and download the purchased ring tone to a cellular telephone. The consumer may then use the ring tone as long as the consumer continues to use the cellular telephone. Once the cellular telephone is replaced, the consumer is forced to re-purchase the ring tone. As cellular telephones are replaced approximately every two years, a consumer is never able to realize the promise of content use for as long as the consumer desires. A consumer may seek to avoid this effect by moving the ring tone to the newly purchased cellular telephone, but such is typically both technically challenging and illegal.

In addition, while a number of application devices including the aforementioned devices have proven capabilities as stand alone devices, the interoperability of such devices has and continues to leave much to be desired. For starters, interconnection of the various devices is often a complicated process. Each of the devices may utilize a different interface type and in some cases the interface may be proprietary. This has left a consumer in what feels like a hopeless morass of wires and interface connectors. Personal computer manufacturers are now offering machines that include a variety of interface ports accessible on the front panel of the machines and operating system developers have long envisioned a common grouping of drivers for different types of devices. While these efforts have aided interoperability, they have had the deleterious effect of forcing a consumer to maintain a personal computer as a hub for the myriad of application devices operated by the consumer. This has at times proven to be cumbersome, expensive and otherwise undesirable to the consumer.

One possible solution is to increase the capability of various application devices to avoid the need to use a personal computer as an interoperability hub. Such an approach has proven effective from a technical standpoint in limited circumstances. However, such an approach requires a substantial distribution and replication of processor capability. This results in both increased complexity and costs. As most application devices are very cost sensitive, it is unlikely that such an approach will find a business model that supports its use as a general solution.

Hence, for at least the aforementioned reasons, there exists a need in the art for advanced devices and methods for connectivity, interoperability, data storage, data retrieval and/or data acquisition.

BRIEF SUMMARY OF THE INVENTION

The present invention is generally related to devices and methods for distributing data, and in particular to systems and methods for storing and distributing data in a wireless mobile environment.

Various embodiments of the present invention provide an intelligent data repository that is capable of binding to a variety of mobile and/or fixed application devices, and performing data storage and retrieval in relation to the bound devices. In some cases, intelligent data repositories are referred to herein as Universal Mobile Connected Storage ("UMCS") devices. Through use of the aforementioned intelligent data repository, the autonomy of data maintained on the repository is increased when compared with the traditional computer architecture where memory access is governed by a processor local to the application device. Indeed, in some cases, such an approach eliminates or reduces the need for sophisticated processor control in various interoperating application devices that are bound to the intelligent data repository.

In some cases of the aforementioned embodiments, transmission from the intelligent data repository is accomplished via a wireless interface allowing for increased interoperability and user friendliness. In particular instances, a single antenna is provided such that wireless communication is limited to one interoperable device at a time. In other instances, multiple antennae or a single multiplexed antenna is provided such that interoperability can be performed in relation to multiple application devices at any given time.

In various cases of the aforementioned embodiments, the intelligent data repository is a highly mobile stand alone device with capability to auto-detect, bind and authorize devices that come into proximity to the intelligent repository. As such, various instances of the aforementioned embodiments are deployed as stand alone devices that may be used in relation to any number of different interoperable application devices. In other cases, an intelligent repository in accordance with one or more embodiments of the present invention is deployed in relation to a particular consumer device. For example, an intelligent repository may be deployed as part of a cellular telephone or in conjunction with a cellular telephone. As such, the ubiquitous nature of a cellular telephone provides a unique opportunity to interact with the intelligent data repository using the user interface of the cellular telephone. This limits the need for an extensive user interface on the intelligent data repository. Based on the disclosure provided herein, one of ordinary skill in the art will appreciate a myriad of application devices with which an intelligent data repository in accordance with one or more embodiments of the present invention may be deployed.

Some embodiments of the present invention provide systems for maintaining and distributing reusable content objects. Such systems include one or more mobile application devices that each includes a processor that is operable to utilize a user data set in a particular application; and a mobile storage device that is communicably coupled to the mobile application device via a wireless interface. The wireless interface may be, but is not limited to a Bluetooth wireless interface or an 802.11 compliant interface. Based on the disclosure provided herein, one of ordinary skill in the art will recognize a variety of wireless interfaces that may be used in relation to embodiments of the present invention. The mobile storage device includes a memory system with a non-volatile storage medium, and a processor. The non-volatile storage medium may include, but is not limited to, a hard disk drive and/or a flash memory.

The memory system includes instructions executable by the processor of the mobile storage device to: store the user data set in the non-volatile storage medium; receive a request to provide the user data set to the mobile application device; and provide the user data set to the mobile application device via the wireless interface. In some instances of the aforementioned embodiments, the system further includes a graphical user interface that is incorporated with the mobile application device. In such cases, the graphical user interface operates as a remote graphical user interface for the mobile storage device. In various cases, the memory system includes instructions further executable by the processor to: receive the user data set from an identified source that is different from the mobile data storage device and the mobile application device. The mobile application device may be, for example, an audio player such as a headset or an MP3 player, a video player such as an MPEG player, or a cellular telephone.

In one particular instance of the aforementioned embodiments, the mobile application device is the cellular telephone that includes a graphical user interface. In such a case, the graphical user interface of the cellular telephone operates as a remote graphical user interface for the mobile storage device. One or more operations of the mobile storage device may be controllable via the remote graphical user interface. For example, an operation governing transfer of data between the mobile storage device and another mobile application device may be controlled via the graphical user interface. As another example, an operation controlling the connection of another mobile application device to the mobile storage device may be controlled through use of the remote graphical interface.

Other embodiments of the present invention provide mobile data acquisition and distribution devices. Such devices include a memory system with a non-volatile storage medium, a wireless interface and a processor. The memory system includes instructions executable by the processor to: receive a user data set, and to store the user data set to the non-volatile storage medium. The instructions are further executable to: receive a request initiated through a remote user interface via the wireless interface to provide the user data set to a recipient device; and provide the user data set to the recipient device via the wireless interface. In some instances of the aforementioned embodiments, at least the non-volatile storage medium and the processor are enclosed in a case including a limited input/output functionality. Such limited input/output functionality includes three or fewer switches. Such switches may be, for example, slide switches, push buttons, or rocker switches. One of the aforementioned switches may be a power switch, while another of the buttons may be an on/off switch for a transmitter associated with the wireless interface.

In some instances of the aforementioned embodiments, the recipient device is a mobile application device, and the remote user interface is a graphical user interface integrated with the mobile application device. In such instances, the instructions are further executable by the processor to provide a menu list to the graphical user interface. In other instances, the recipient device may be one mobile application device, and the remote user interface may be a graphical user interface integrated with another mobile application device. In such cases, the instructions may still be executable to provide a menu list to the graphical user interface.

Yet other embodiments of the present invention provide mobile storage devices that include a storage medium, a wireless interface and a processor. The storage medium includes instructions executable by the processor to: provide a menu of data available on the storage medium to a user interface via the wireless interface, receive a control direction from the mobile application device, and execute the control instruction. The aforementioned user interface is integrated into a mobile application device.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is generally related to devices and methods for distributing data, and in particular to systems and methods for storing and distributing data in a wireless mobile environment.

Figure 1:
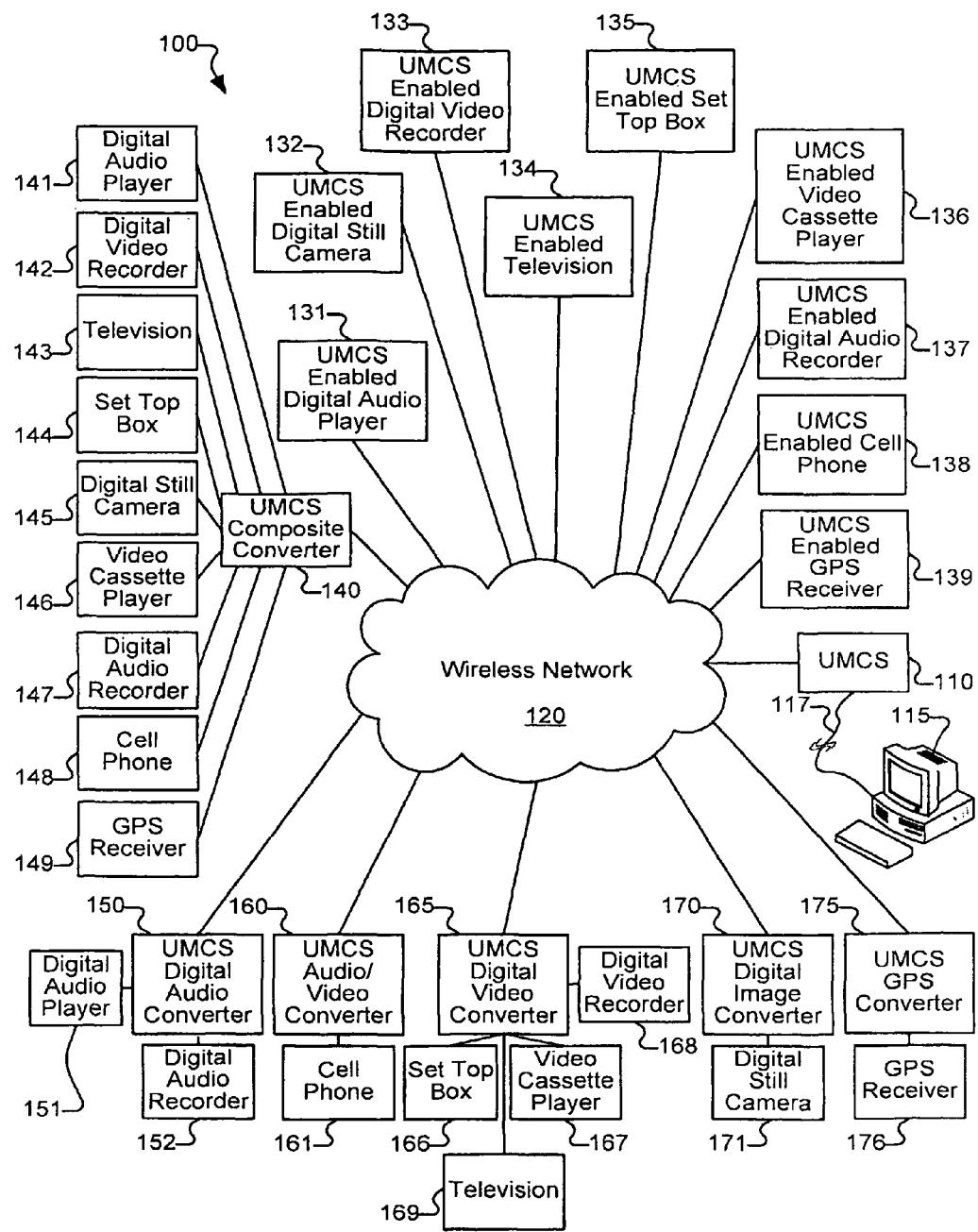
FIG. 1 depicts various UMCS devices and UMCS enabled application devices in accordance with some embodiments of the present invention.

Turning to FIG. 1, a diagram depicts an exemplary content usage network 100 in accordance with various embodiments of the present invention. Exemplary content usage network 100 includes a Universal Mobile Connected Storage device ("UMCS") 110 at the core thereof. UMCS 110 is able to receive content from one or more online and wireless content providers as well as from various self maintained content equipment such as, for example audio recorders and video recorders. In some cases, UMCS 110 may be intermittently wired to a personal computer 115 via a cable 117. In such cases, UMCS 110 may be configured via personal computer 115 using the standard I/O interfaces associated with personal computer 115. For the purposes of this document, personal computer 115 is considered a fixed or wired application device. Alternatively, UMCS 110 may be communicably coupled to personal computer 115 via a wireless network 120. In such cases, UMCS 110 may be configured via personal computer 115. It should be noted, however, that UMCS 110 may be configured using one or more of the other application devices discussed in the succeeding paragraphs.

Wireless network 120 may be any wireless network known in the art. Thus, for example, wireless network 120 may be, but is not limited to, a Bluetooth™ network as is known in the art. It should be noted that while UMCS 110 may be configured across wireless network 120 using the user interface of another application device, and it may also be configured using other approaches. Thus, for example, UMCS 110 may be self configuring. In such a case, UMCS 110 is implemented with enough intelligence to auto detect an available wireless network as well as devices attached via the wireless network. As a particular example, UMCS 110 may be implemented such that when power is applied to the device it automatically scans for Bluetooth™ devices that are within range of UMCS 110. Based on the detected Bluetooth™ devices, UMCS 110 may form a service offering as is more fully discussed below.

UMCS 110 is capable of interacting with various devices and classes of devices via wireless network 120. For example, in some cases, UMCS 110 is operable to interact directly with UMCS enabled application devices via wireless network 120. Such UMCS enabled application devices include capability to authenticate to UMCS 110 and to accept and transfer information from/to UMCS 110, and to provide digital rights management whereby content is secured not only in the transfer between UMCS 110 and the UMCS enabled application device, but is also maintained secure within the UMCS enabled application device. In the situation where wireless network 120 is a Bluetooth™ network, the aforementioned UMCS enabled application devices would include Bluetooth™ capability.

As suggested above, one or more embodiments of the present invention may incorporate functionality that allows it to distribute copy-protected content across multiple application devices, while maintaining the integrity of the copy protection. Some examples of accessing and distributing copy-protected content are disclosed in the application entitled "Systems and Methods for Enabling Consumption of Copy-Protected Content Across Multiple Devices" that was previously incorporated herein by reference for all purposes.

In some cases, the UMCS enabled application devices include the ability to decode content objects received from UMCS 110. In such cases, UMCS 110 may include the ability to unwrap (i.e., satisfy any digital rights management requirements) content accessed from a storage medium incorporated within UMCS 110. Further, UMCS 110 includes capability to transmit the unwrapped content to the enabled recipient device. In such cases, the enabled recipient device would decode the received content and assure security thereof. In some cases, the decoding algorithm is provided to the enabled device from UMCS 110, and in other cases, the decoding algorithm is maintained on the enabled recipient device and is selected in relation to the received content from UMCS 110. UMCS enabled application devices include, but are not limited to, a UMCS enabled digital audio player 131, a UMCS enabled digital still camera 132, a UMCS enabled digital video recorder 133, a UMCS enabled television 134, a UMCS enabled set top box 135, a UMCS enabled video cassette player 136, a UMCS enabled digital audio recorder 137, a UMCS enabled cellular telephone 138, and a UMCS enabled GPS receiver 139. Based on this disclosure, one of ordinary skill in the art will appreciate a variety of interactions between UMCS 110 and UMCS enabled application devices in accordance with various embodiments of the present invention. For example in some of the aforementioned cases, UMCS 110 may not include the ability to unwrap content, but rather the recipient UMCS enabled application device may include the capability to unwrap any content provided from UMCS 110. Further, based on the disclosure provided herein, one of ordinary skill in the art will appreciate a variety of other UMCS enabled application devices that may be used in relation to one or more embodiments of the present invention.

In various cases, UMCS 110 is operable to interact directly with non-UMCS enabled application devices via wireless network 120. In such cases, either UMCS 110 includes capability to tailor output and receive input from the non-UMCS enabled application device, or the non-UMCS enabled application devices may interact with UMCS 110 via a specialized UMCS converter that is tailored for operation with a class of devices. Thus, for example, where wireless network 120 is a Bluetooth™ network, the UMCS converter may be enabled to receive from and provided information to a non-UMCS enabled application device via any one of a number of communication approaches, and to communicate the information to/from UMCS 110 using a Bluetooth™ protocol. As an example, UMCS 110 may interact with digital audio devices (e.g., a digital audio player 151 and a digital audio recorder 152) via a UMCS digital audio converter 150. As another example, a cellular telephone 161 or personal digital assistant (not shown) may interact with UMCS 110 either directly or via a UMCS audio/video converter 160. As yet another example, UMCS 110 may interact with video devices (e.g., a set top box 166, a video cassette player 167, a digital video recorder 168 and a television 169) via a UMCS digital video converter 165. As yet a further example, UMCS 110 may interact with still image devices such as a digital still camera 171 or a printer (not shown) via a UMCS digital image converter 170. As yet another example, UMCS 110 may interact with a GPS receiver/display 176 via a UMCS GPS converter 175.

In such cases, decoding of content accessed from a storage medium included in UMCS 110 is done using a decoder provided in the respective UMCS converters 150, 160, 165, 170, 175. Thus, the content is unwrapped by UMCS 110 and the unwrapped content is provided to the particular UMCS converter via wireless network 120. The UMCS converter decodes the content and provides it to the appropriate recipient device while at the same time assuring that any demanded digital rights management is maintained. In some cases, the various UMCS converters may be implemented as dongles associated with one or more recipient devices.

In other cases, UMCS 110 incorporates the decoding function. In such cases, UMCS 110 authenticates the device to which content is to be transferred, accesses content maintained on a storage medium associated with UMCS 110, unwraps the retrieved content, decodes the unwrapped content and transfers the decoded content to the recipient device. In such a case, UMCS 110 may include a number of standard decoders installed on UMCS 110. Alternatively, in some cases, UMCS 110 may download an appropriate decoder from a UMCS enabled application device or from a UMCS converter.

In various cases, UMCS 110 is operable to interact directly with non-UMCS enabled application devices via a UMCS composite converter 140. UMCS composite converter 140 is operable to provide for UMCS interaction with multiple classes of recipient devices. Thus, for example, where wireless network 120 is a Bluetooth™ network, UMCS composite converter 140 may be enabled to receive from and provided information to different classes of non-UMCS enabled application devices via any one of a number of communication approaches, and to communicate the information to/from UMCS 110 using a Bluetooth™ protocol. As an example, UMCS composite converter 140 may couple UMCS 110 to, for example, a digital audio player 141, a digital video recorder 142, a television 143, a set box 144, a digital still camera 145, a video cassette player 146, a digital audio recorder 147, a cellular telephone 148, and a GPS receiver 149, or some combination of the aforementioned device classes. In such cases, decoding of content accessed from a storage medium included in UMCS 110 is done using a decoder provided in UMCS composite converter 140. Thus, the content is unwrapped by UMCS 110 and the unwrapped content is provided to the UMCS composite converter 140 via wireless network 120. UMCS composite converter 140 decodes the content and provides it to the appropriate recipient device while at the same time assuring that any demanded digital rights management is maintained. In some cases, UMCS composite converter 140 may be implemented as a dongle associated with one or more recipient devices.

In some instances of the aforementioned embodiments, UMCS 110 includes an ability to detect wireless network 120 and UMCS enabled application devices associated with wireless network 120. Further, UMCS 120 is capable of binding the detected device(s) through a process of authenticating the detected network/devices and for automatically providing access to/from the detected devices. Where, for example, wireless network 120 is a Bluetooth™ network, the process of detecting, binding and authenticating may be satisfied in accordance with the Bluetooth™ specification. In such cases, UMCS 110 may also be brought into proximity of a router (not shown), personal computer 115 and/or some UMCS enabled display device. In such cases, UMCS 110 is operable to display its contents and bound devices in one of a variety of ways. For example, UMCS 110 may be displayed as a drive attached to personal computer 110 with content thereon as well as devices bound thereto being displayed as available content. Where the content is displayed on a bound device only capable of handling certain content types, the displayed content may be limited to only that which is germane to the proximate device. Thus, for example, it may be that only audio content may be displayed to an audio player. In such a case, video or other content types may be hidden from the audio player.

Interaction of the devices set forth above in relation to FIG. 1 may be facilitated by an application programming interface (API). Such an API allows for communication between various device classes. In some cases, the interaction may occur regardless of the operating system or other operational details related to both the UMCS and the application device. In some cases, the UMCS of FIG. 1 may be accessed by more than a single user. Such access may include use of various authorization and/or authentication techniques. Exemplary approaches to such multi-user access are discussed in the application entitled "Systems and Methods for Multi-user Access to a Wireless Storage Device" that was previously incorporated herein by reference for all purposes.

Figure 2A:
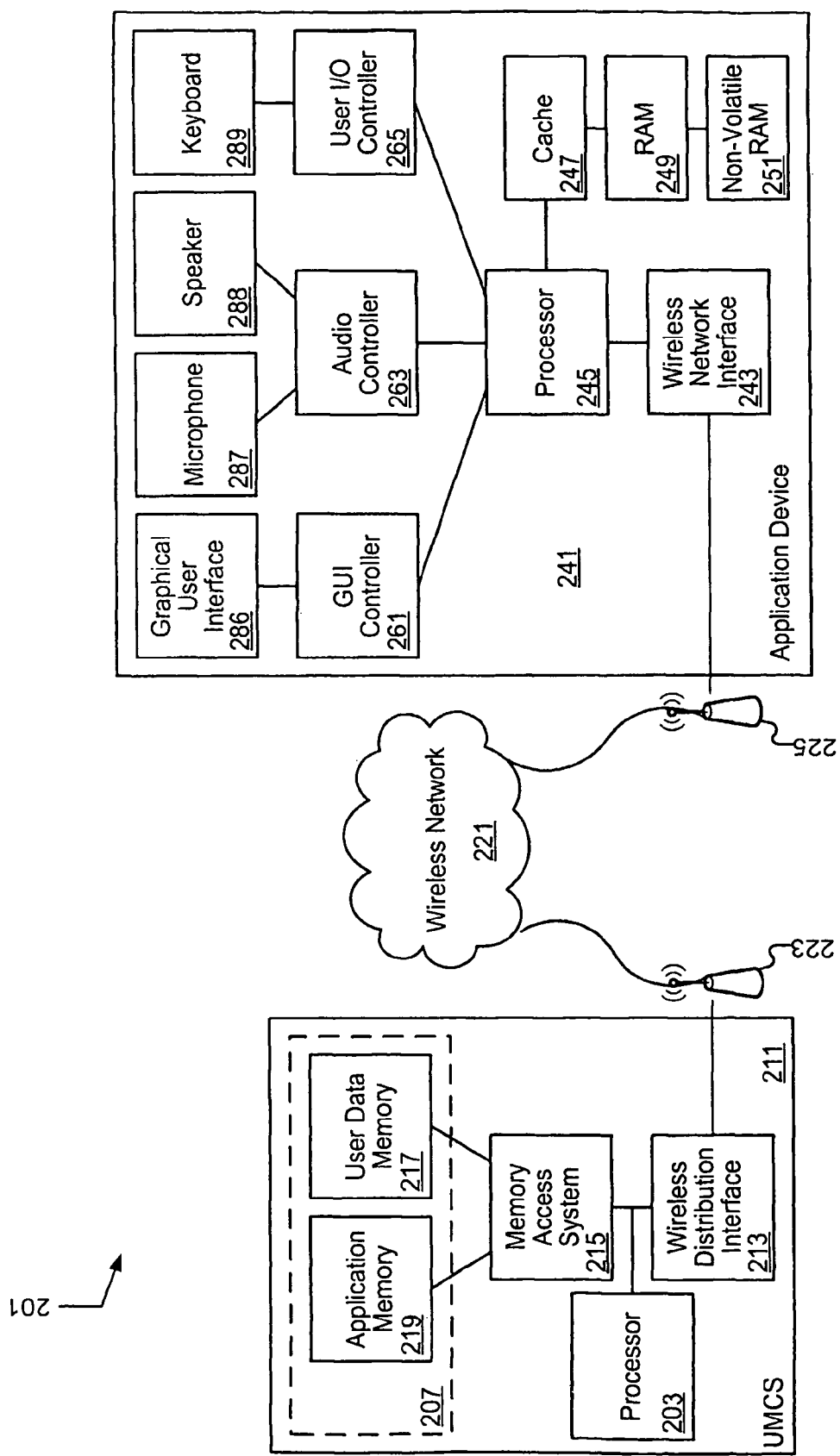
FIG. 2a depicts an exemplary UMCS device coupled with a mobile application device in accordance with various embodiments of the present invention.

Turning to FIG. 2a, a mobile data acquisition, storage and/or distribution system ("mobile storage system") 201 in accordance with one or more embodiments of the present invention is depicted. Mobile storage system 201 includes a UMCS 211 communicably coupled to a mobile application device 241 via a wireless network 221. Wireless network 221 may be any wireless network capable of transferring information between UMCS 211 and mobile application device 241. Thus, for example, wireless network 221 may be, but is not limited to, a Bluetooth™ network or a Wi-Fi network that is, for example, 802.11 compliant. Based on the disclosure provided herein, one of ordinary skill in the art will recognize a variety of wireless networks that may be used in relation to one or more embodiments of the present invention. In some embodiments, communication between UMCS 211 and mobile application device 241 is accomplished directly between the two devices without utilizing an intervening wired hub.

UMCS 211 includes a memory system 207 that includes both application memory 219 and user data memory 217. As used herein, the phrase "application memory" is used in its broadest sense to mean memory allocated to include software or firmware applications. As known in the art, such software and firmware applications include instructions executable by a processor to perform one of a number of desired operations. As used herein, the phrase "user data memory" is used in its broadest sense to mean any memory allocated for data other than application data. Thus, for example, user data memory may store, but is not limited to, audio files, video files, documents and other types of user data. As is more fully discussed below in relation to FIGS. 3-4, memory system 207 may be implemented with one or both of volatile and non-volatile memory media. As used herein, the phrase "non-volatile memory" is used in its broadest sense to mean any memory that maintains its contents when power is removed from the memory. As used herein, the phrase "volatile memory" is used in its broadest sense to mean any memory that does not maintain its contents when power is removed from the memory.

UMCS 211 also includes a memory access system 215 that may be any circuitry and/or programmable controller that provides for access to and from memory system 207. UMCS 211 also includes a processor 203 that is capable of directing operation of UMCS 211. In one particular case, processor 203 is capable of accessing application memory 219 that includes instructions executable by processor 203 to receive a user data set via wireless distribution interface 213; store the user data set to memory system 207; receive a request initiated through a remote user interface to provide the user data set to a recipient device; and provide the user data set to the recipient device via the wireless interface. Based on the disclosure provided herein, one of ordinary skill in the art will recognize a myriad of instructions that maybe executable by processor 203 to cause any of a number of operations to be performed by UMCS 211.

UMCS 211 further includes a wireless interface that includes a wireless distribution interface 213 and an antenna 223. Wireless distribution interface 213 includes all of the circuitry required to format data for transmission via a wireless protocol recognized by wireless network 221. Thus, where wireless network 221 is a Bluetooth™ network, wireless distribution interface 213 may be any Bluetooth™ interface for transferring data between UMCS 211 and wireless network 221. As will be appreciated by one of ordinary skill in the art, where wireless network 221 uses another wireless protocol, wireless distribution interface 213 may be any interface capable of transferring data between UMCS 211 and wireless network 221 using the other interface protocol.

It should be noted that while mobile storage system 201 may include any number of application devices (mobile application device 241 is examplary of such application devices) that are communicably coupled to UMCS 211 via wireless interface 221. In some cases, one or more of the aforementioned application devices may be mobile application devices, while others are wired application devices. As used herein, the phrase "mobile application device" is used in its broadest sense to mean any electronic device capable of implementing one or more applications without being wired to any other device or power source. Thus, for example, a mobile application device may be, but is not limited to, a cellular telephone, a wireless headset, a personal digital assistant, a laptop computer, an MP3 player, and a mobile DVD player. Based on the disclosure provided herein, one of ordinary skill in the art will recognize a variety of mobile application devices that may be used in relation to one or more embodiments of the present inventions.

Mobile application device 241 includes a wireless interface that comprises a wireless network interface 243 and an antenna 225. Wireless network interface 243 may be any wireless interface known in the art that is capable of transferring data between mobile application device 241 and another device on wireless network 221. Mobile application device also includes a processor 245 that controls operation of the device. Mobile application device 241 includes a memory system comprising a cache 247, a random access memory 249 and a non-volatile random access memory 251. Further, mobile application device 241 includes a variety of input/output services including a graphical user interface controller 261, an audio controller 263 and a USER I/O controller 265. Graphical user interface controller 261 supports a graphical user interface 286 that may be integrated with mobile application device 241. Audio controller 263 supports an audio input device such as microphone 287 and an audio output device such as speaker 288. User I/O controller supports a keyboard 289 and in some cases a mouse or pen interface device as are known in the art.

Figure 2B:
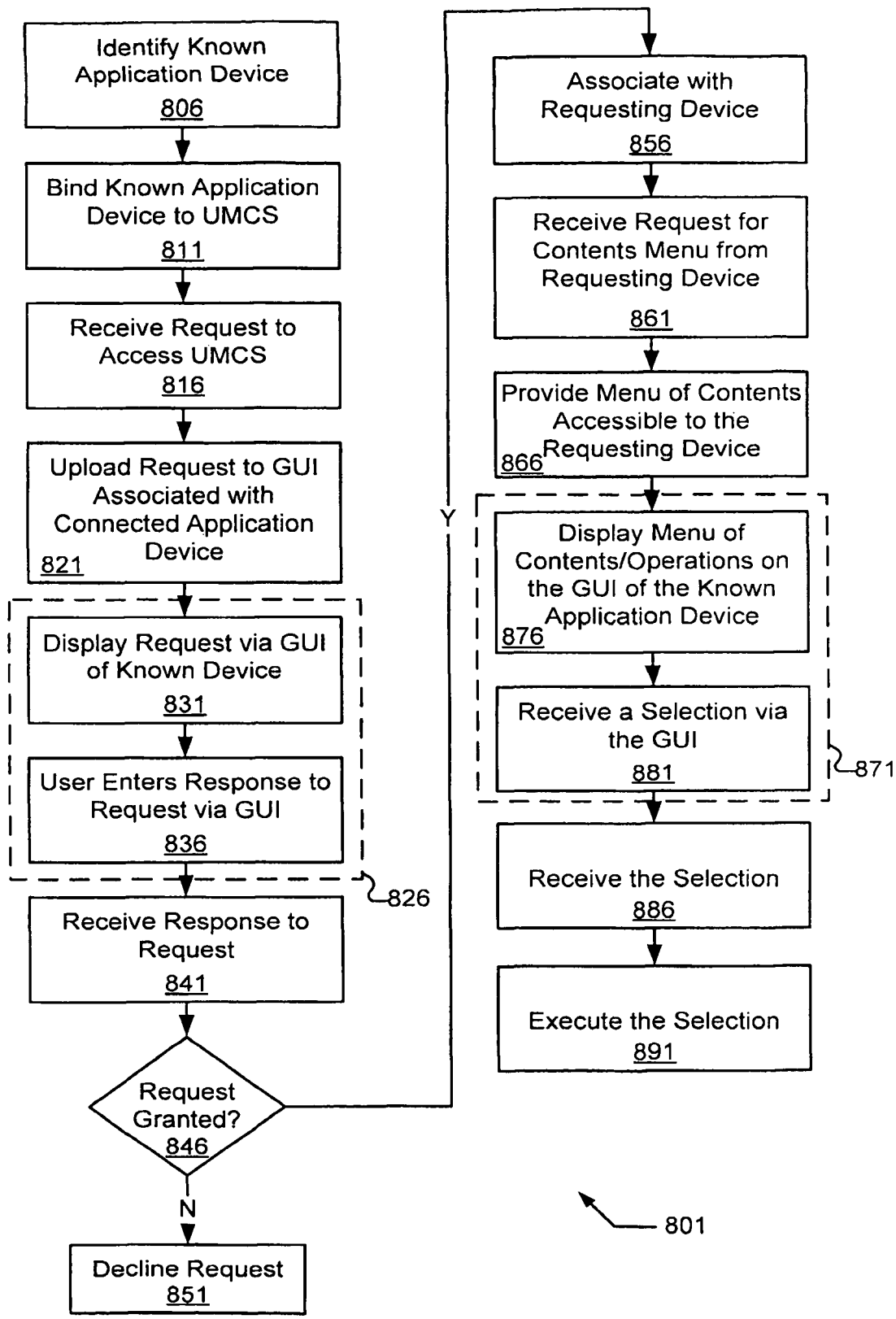
FIG. 2b is a flow diagram illustrating a method in accordance with some embodiments of the present invention for operating a UMCS device via a remote graphical user interface.

Turning to FIG. 2b, a flow diagram 801 illustrates a method in accordance with some embodiments of the present invention for operating a UMCS device. Following flow diagram 801, UMCS 211 identifies one or more known application devices within wireless range (block 806), and binds itself to the identified devices such that communication between the devices is enabled (block 811). In this example, the identified device includes a graphical user interface. As one example, UMCS 211 may be programmed to automatically connect to a particular cellular telephone or a mobile media player using a Bluetooth™ network. In such a case, when UMCS 211 identifies the cellular telephone or mobile media player, it establishes a communication link between UMCS 211 and the particular device.

Later, UMCS 211 receives a request to connect from another unknown or otherwise unauthorized application device (block 816). Such a request may be from another device capable of communicating via the wireless network on which UMCS 211 is communicating. Thus, for example, a car stereo may be within range and may desire a communication link between it and UMCS 211. Based on the disclosure provided herein, one of ordinary skill in the art will recognize a variety of application devices that may request a connection with UMCS 211. A command representing the received connection request is uploaded from UMCS 211 to the previously bound known application device including a graphical user interface (block 821). The command causes a graphical request to be displayed to the user via the graphical user interface of the known application device (block 831). The user then responds to the request using the graphical user interface of the known application device (block 836). As indicated by the dashed line around an area 826, the operations of block 831 and block 836 are performed on the known application device. The response to the command is then transferred to UMCS 211 (block 841).

Where the request was denied by the user (block 846), a corresponding denial of the request to connect is issued (block 851). Alternatively, where the request is granted by the user (block 846), a communication link is established between the requesting device and UMCS 211 (block 856). In turn, the requesting device may ask for a menu of operations available from UMCS 211 (block 861). Thus, for example, where the requesting device is an MP3 audio player, it may request a list of all music maintained in the memory system of UMCS 211. As another example, where the requesting device is a video player, it may request a list of all of the video clips maintained in the memory system of UMCS 211. Based on this request, UMCS 211 determines what operations are to be made available to the requesting device, and a menu of contents or operations available to the requesting device are provided as a command to the graphical user interface of the known application device (block 866).

This menu of available operations is displayed using the graphical user interface of the known application device (block 876), and the user enters their selection(s) from the list via the graphical user interface (block 881). As indicated by the dashed line around an area 871, the operations of block 876 and block 881 are performed on the known application device. The response from the user is then transferred to UMCS 211 (block 886). UMCS 211 then executes the user selection (block 891). Thus, for example, where the user selects a particular music file, the selected music file is accessed from the memory system of UMCS 211 and transferred to the requesting device via a wireless network. Based on the disclosure provided herein, one of ordinary skill in the art will recognize a myriad of devices that may bind to UMCS 211, and thereafter be controlled via a graphical user interface of another device bound to UMCS 211. Further, one of ordinary skill in the art will recognize a myriad of commands and/or selections that may be received by UMCS 211 from a variety of sources, and handled using the graphical user interface of another connected application device.

Figure 2C:
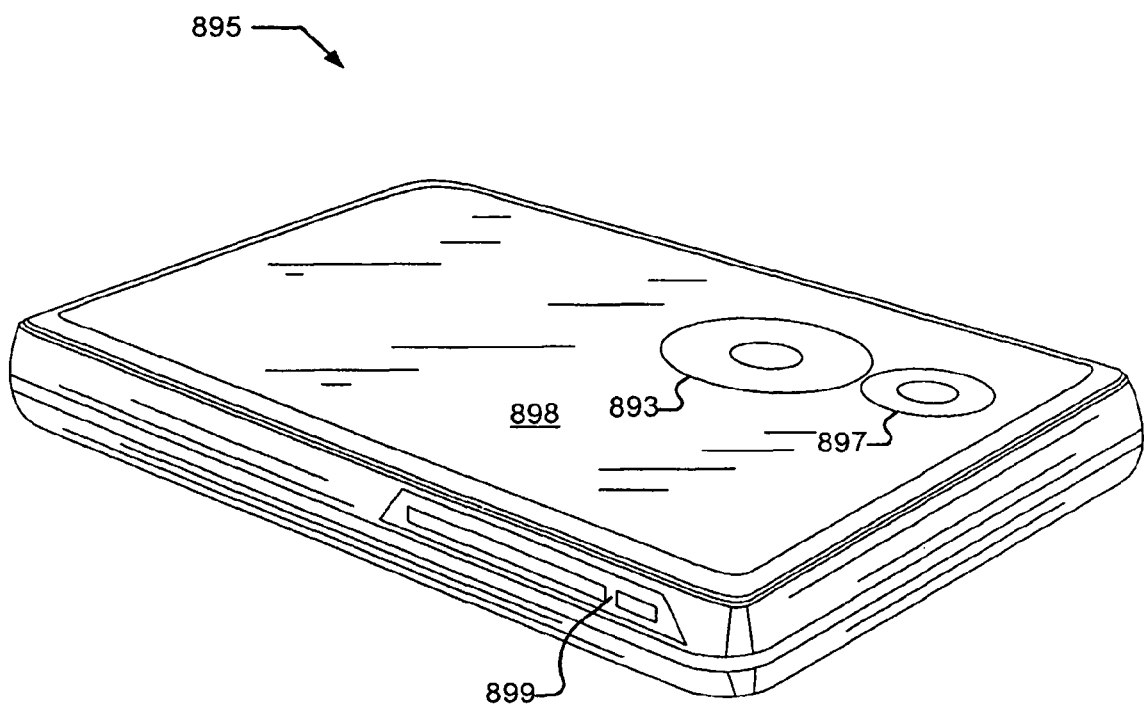
FIG. 2c shows an exemplary case for a UMCS device including only a very limited user interface.

Based on the aforementioned discussion, one of ordinary skill in the art will appreciate that UMCS 211 may be designed without a graphical user interface, and may include functionality allowing it to bind to another device that includes a graphical user interface and to utilize that graphical user interface. In some cases, UMCS 211 may be encased in such a way that when operated wirelessly only a very limited user interface is available directly on UMCS 211. This limited user interface may include three or fewer switches (e.g., selector buttons, rocker switches, slide switches or the like). As an example, one of the buttons may be a power on button and another may be operable to turn off the wireless interface when, for example power consumption is to be limited or interference concerns exist. Turning to FIG. 2c, an exemplary case 895 for UMCS 211 including only a limited user interface is shown. As shown, case 895 includes a hard shell 898 with a power switch (as shown it is a button, but could be any other switch type) 893 and a wireless switch (as shown it is a button, but could be any other switch type) 897. Also, one or more electrical interfaces 899 are included to allow for wired connection via, for example, a USB interface, or for receiving, for example, a memory card. As will be appreciated by one of ordinary skill in the art based on the disclosure provided herein, the lack of a graphical display reduces the cost and increases the durability of case 895.

In some cases, an application interface ("API") including a number of software instructions executable to access UMCS 211 may be defined. As one of many examples, the following command set may be defined to access UMCS 211:

Provide Remote Graphical Interface
    Music Selections
    Video Selections
    Music and Video Selections
    Game Selections
    Data Selections
Provide Music Selection
    Provide in Selected Export Format
    Provide in Native Format
    Provide to Single Recipient
    Provide to Multiple Recipient
Provide Game Selection
    Provide in Selected Export Format
    Provide in Native Format
    Provide to Single Recipient
    Provide to Multiple Recipient
Provide Play List
    Provide in Selected Export Format
    Provide in Native Format
    Provide to Single Recipient
    Provide to Multiple Recipient
Provide Video Selection
    Provide in Selected Export Format
    Provide in Native Format
    Provide to Single Recipient
    Provide to Multiple Recipient
Provide Available Wireless Devices List
Bind to Wireless Device
Cross Connect Wireless Devices
Provide Overall Data Availability List
    Provide Public List
    Provide Friend List
    Provide Private List Based on the disclosure provided herein, one of ordinary skill in the art will recognize a variety of other commands that may be implemented to provide an organized and defined access to UMCS 211. It should be noted that UMCS 211 is capable of both receiving data from a providing device, and of providing information to a receiving device.

Figure 3:
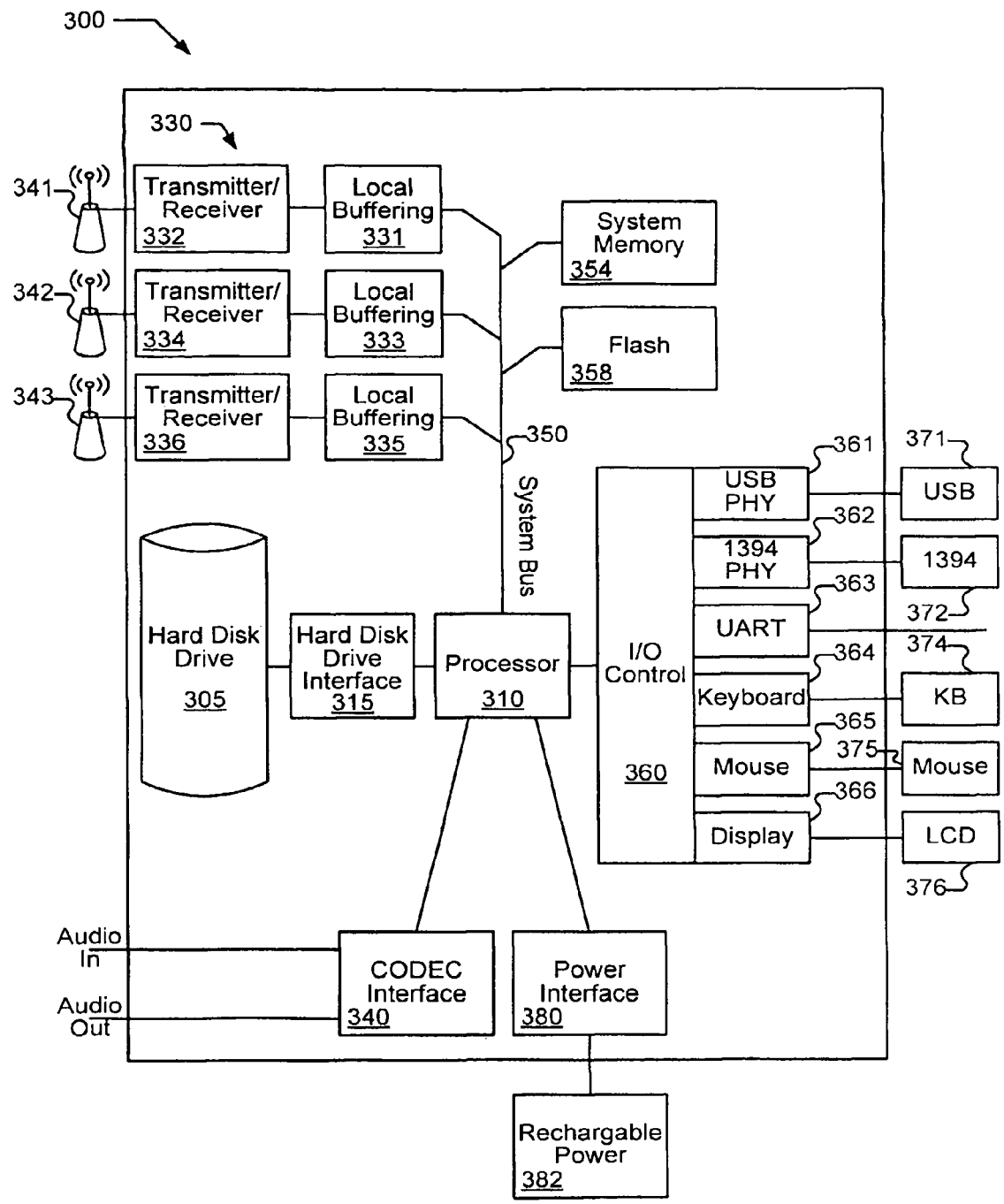
FIG. 3 is a block diagram of an exemplary UMCS device in accordance with some embodiments of the present invention.

Turning to FIG. 3, a UMCS 300 in accordance with one or more embodiments of the present invention is depicted. UMCS 300 includes a hard disk drive 305 that is accessible to a processor 310 via a hard disk drive interface 315. Hard disk drive interface may be any interface known in the art that allows for transferring data to and from hard disk drive 315. Further, hard disk drive 305 may be any hard disk drive known in the art. It should be noted that in various embodiments of the present invention that the hard disk drive can be replaced or augmented by a bank of solid state memory such as flash memory, or some constantly powered random access memory. Indeed hard disk drive 305 may be replaced or augmented by any non-volatile memory known in the art. Where hard disk drive 305 is replaced or augmented, hard disk drive controller 315 may correspondingly be replaced or modified to allow the transfer of data to or from the chosen non-volatile storage medium.

In one particular case, hard disk drive interface 315 is a standard ATA interface and hard disk drive 305 is an ATA hard disk drive. In addition, UMCS 300 includes multiple transmission paths 330 each coupled to processor 310 via a system bus 350. As depicted, UMCS 300 includes three distinct transmission paths each including a transmitter/receiver 332, 334, 336 electrically coupled to a respective antenna 341, 342, 343 and a local buffering memory 331, 333, 335. It should be noted that UMCS 300 may include more or fewer transmission paths depending upon the intended use and/or design of UMCS 300. Some embodiments of the present invention utilize Bluetooth transmission paths. Such paths are low power paths that are useful for mobile devices that are expected to operate for many hours. Further, such paths offer sufficient bandwidth for audio/video streaming. For example, in one particular embodiment of the present invention, the combination of the transmission paths offers 1.5 Mbits/sec. This level of bandwidth allows MPEG4/Divx content at full 720×380 resolution. Such transmission paths allows for operation in relation to various hard disk drives including one inch to 1.8 inch drives. It should be noted that while three separate antennae 341, 342, 343 are shown, that some embodiments may utilize a single antenna capable of use by all of the implemented transmission paths.

In other cases, the bandwidth supported by the transmission paths is 1.5 Mbits/sec per path. In yet other cases, higher bandwidth transmission paths may be utilized. In some particular cases, the bandwidth of one or more of transmission paths 330 are less than 1 Mbit/sec which is sufficient for use in relation with various consumer audio and phone devices. Particular embodiments of the present invention provides an overall bandwidth of 3 Mbit/sec that is sufficient for a serial data stream and two to three audio streams simultaneously. Further, some embodiments of the present invention incorporate a USB 2.0 port for high speed upload and download capability. In some cases, the USB port is implemented as a wireless port, while in other cases the USB port is a wired port. Based on the disclosure provided herein, one of ordinary skill in the art will recognize a variety of wireless transmission protocols that may be supported by one or more of transmission paths 330, and the circuitry implemented to support such transmission paths.

UMCS 300 also includes a memory system comprising a flash memory 358 and a system memory 354 electrically coupled to processor 310 via system bus 310. It should be noted that based on the disclosure provided herein that one of ordinary skill in the art will recognize a number of memory system designs that may be used depending upon the desired characteristics and operational requirements of the end device. Processor 310 is also electrically coupled to an I/O controller 360 that in some cases is integrated into processor 310 and in other cases is a separate device. I/O controller 360 provides capability for UMCS 300 to interact via one or more of a USB bus, a 1394 (i.e., firewire) bus, a UART, a keyboard, a mouse, and/or a display. Interaction via a USB bus includes use of a USB PHY 361 and USB connector 371. Interaction via 1394 includes use of a 1394 PHY 362 and 1394 connector 372. Interaction via a UART includes use of a UART transmitter/receiver 363. Interaction via a keyboard, mouse and/or display includes the appropriate connectors 374, 375, 376 and internal drivers 364, 365, 366. UMCS 300 further includes a power interface 380 that is capable of regulating power from a rechargeable power source 382. Further, UMCS 300 may include an audio CODEC interface 390 capable of providing audio in and out capabilities to UMCS 300 through use of processor 310.

In operation, a content object may be received via one of antennae 341, 342, 343 and transferred to hard disk drive 305 under direction of processor 310. In some cases, multiple content objects may be received or transmitted by using multiple of antennas 341, 342, 343. Thus, as just one particular example, UMCS 300 may be receiving a video content object from a content provider and transmitting the same video content object to a UMCS enabled television capable of decoding the content object. In such a case, reception and buffering of the content object is performed by one of transmission paths 330 and the received content is provided to hard disk drive 305 under the direction of processor 310. At the same time, the content object is retrieved by processor 310 from hard disk drive 305, and unwrapped using a digital rights management protocol indicated by the particular content. In addition, processor 310 authenticates the television via another of transmission paths 330 and transmits the unwrapped content to the television. Based on the disclosure provided herein, one of ordinary skill in the art will recognize a variety of combinations of transmission and reception that are possible using UMCS devices in accordance with one or more embodiments of the present invention. For example, three content objects may be simultaneously received and stored or three content objects may be distributed simultaneously.

The interaction between flash memory 358, hard disk drive 305 and processor 310 may be carefully tailored to assure power savings. Such power management is more fully discussed in the application entitled "Systems and Methods for Power Management in Relation to a Wireless Storage Device" that was previously incorporated herein by reference for all purposes.

Figure 4:
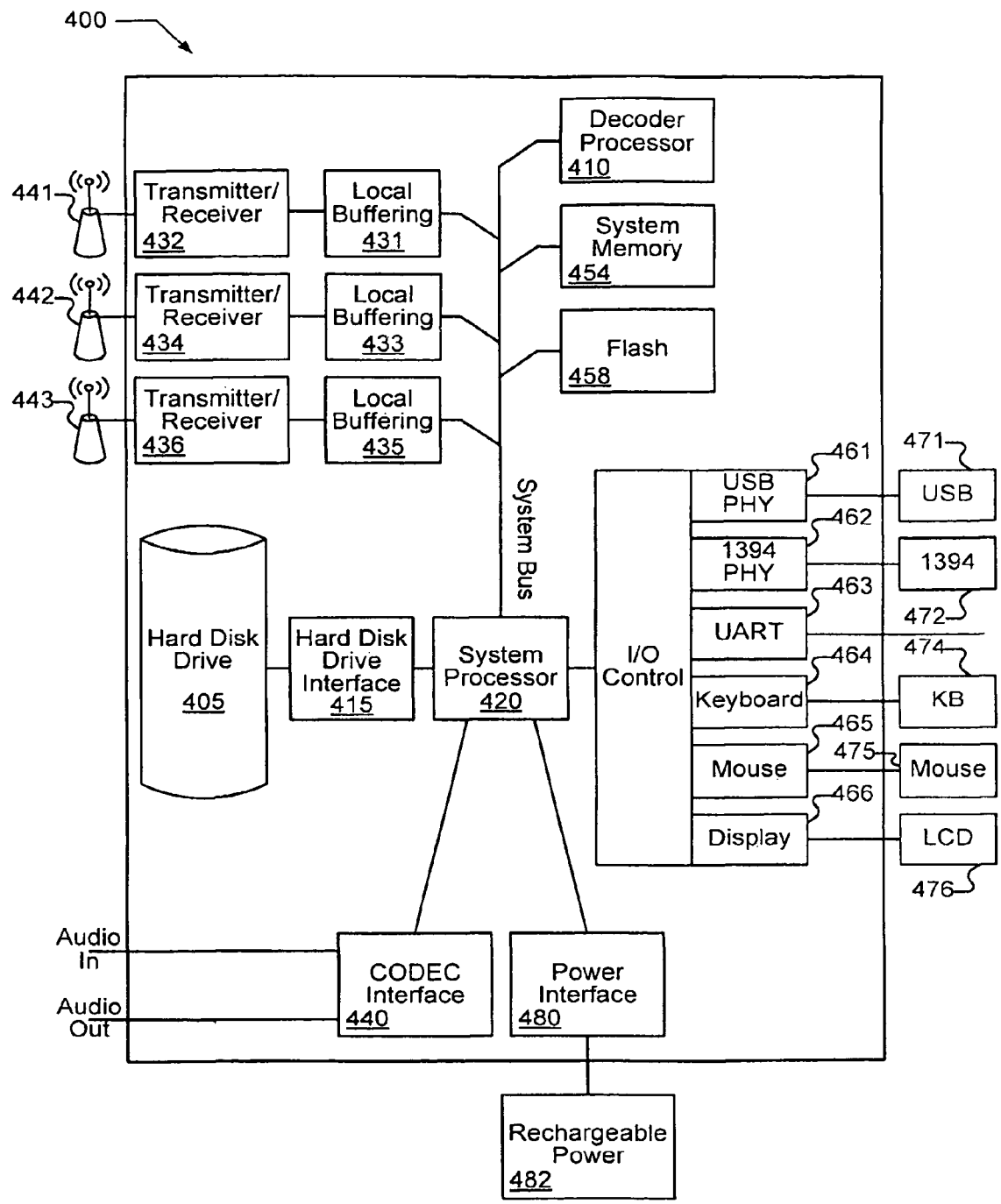
FIG. 4 is a block diagram of another exemplary UMCS device in accordance with other embodiments of the present invention.

Turning to FIG. 4, a UMCS 400 in accordance with one or more embodiments of the present invention is depicted. UMCS 400 is similar to UMCS 300 with the exception of an added specialized system processor 420 in place of processor 310 and decoder processor 410. Decoder processor 410 is specifically added to perform any decoding/encoding of data that may be needed in relation to information being maintained on hard disk drive 405. Decoder processor 410 may be a DSP, a CISC or a RISC processor. In one particular case, decoder processor 410 is a DSP, and system processor 420 is an ARM processor.

In operation, a content object may be provided to a recipient device. In such a case, the recipient device is authenticated by system processor 420 via one of transmission paths 430. In turn, the content object is retrieved from hard disk drive 405 and unwrapped. The unwrapped content object is provided to decoder processor 410 that proceeds to decode the unwrapped content object and to transmit the decoded content object to the recipient device via one of transmission paths 430. As with UMCS 300, based on the disclosure provided herein, one of ordinary skill in the art will recognize that various transmission/reception scenarios may be facilitated using UMCS 400. Further, it will be recognized that multiple transmission paths (receiving and/or transmitting) may be operating simultaneously.

Figure 5:
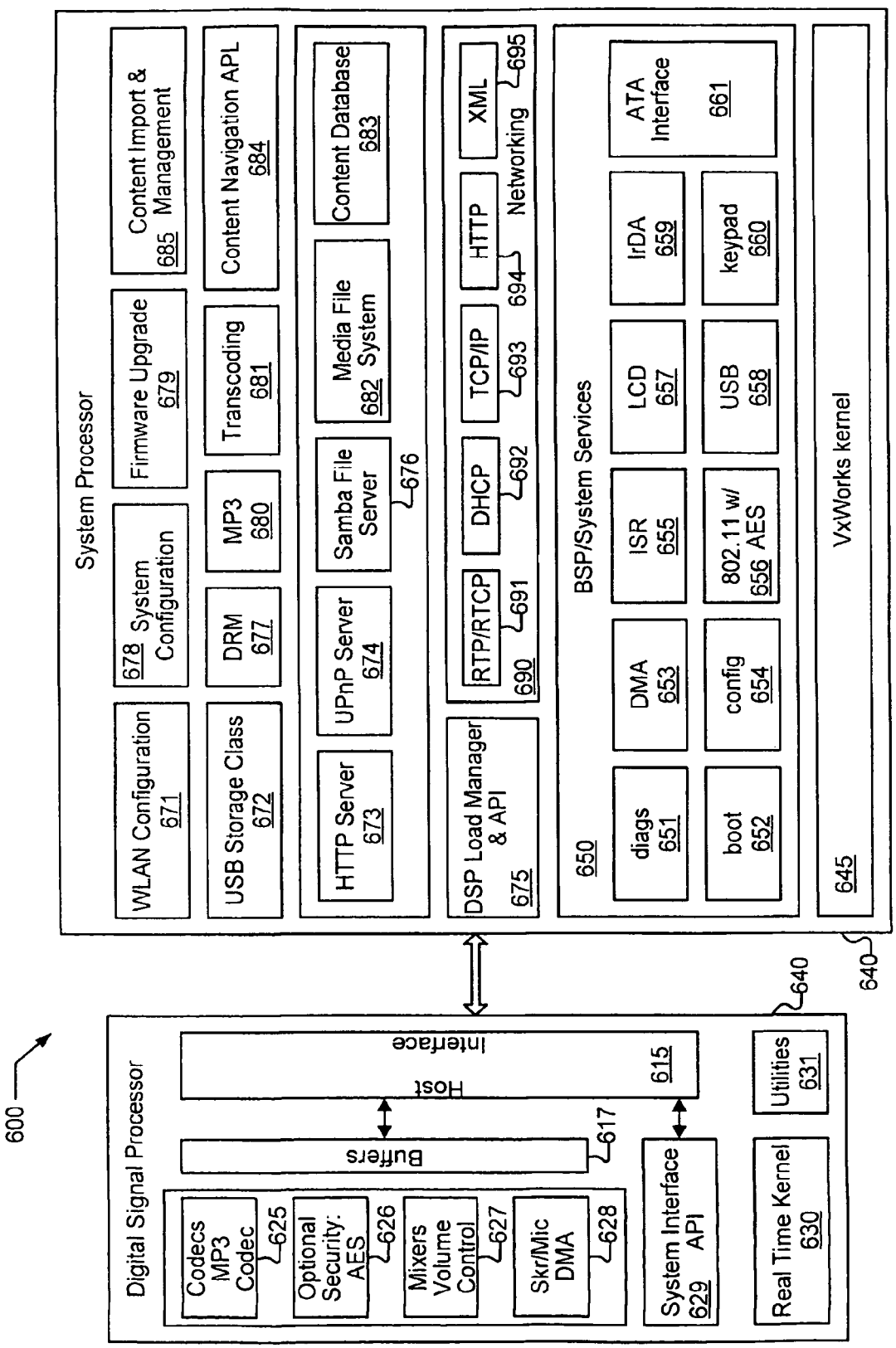
FIG. 5 shows a software system that may be deployed in relation to a UMCS and in accordance with one or more embodiments of the present invention.

Turning to FIG. 5, a software package 600 that may be used in relation to one or both of UMCS 300 and UMCS 400 is depicted. Software package 600 includes both system software 640 and decoder software 610. Decoder software 610 includes a host interface module 615 capable of governing the interaction between the host and decoder. Various buffer modules 617 allow for interaction between host interface module 615 and any number of decoders and/or controller modules. For example, the decoder/controller modules may include, but are not limited to, CODECS such as an MP3 codec 625, Optional Security such as AES security 626, Mixers and volume control modules 627, various DMA modules 628. In addition, decoder software 610 includes a system interface module API 629, a real time kernel 630 and various other utilities 631.

System software 640 includes a VxWorks Kernel 645 and various system services 650. System services 650 may include, but are not limited to, diagnostic services 651, boot and startup services 652, DMA services 653, configuration services 654, interrupt services 655, wireless network services 656, display services 657, wired communication services 658, infrared transmission/reception services 659, I/O services 660, and hard disk drive access services 661. In addition, system software 640 includes networking services 690 including RTP/RTCP services 691, DHCP services 692, TCP/IP services 693, HTTP services and XML services. System software 640 further includes wireless LAN configuration software 671, system configuration software 678, USB storage class software 672, HTTP server software 673, UPnP server software 674, Samba file server software 676, media file system software 682, content database software 683, a content navigation API 684, transcoding software 681, digital rights management software 677, content import and management software 685 and firmware upgrade software 679.

In one particular embodiment of the present invention, the software stack supports the following profiles: DVRCP, A2DP, FTP (which dovetails nicely with USB, and one or more video profiles. Software for the USB port may be configured to support two or more connected devices such that both a camera and a phone or some other combination of devices may be simultaneously connected to the UMCS. Further, the software implemented on the UMCS may further include a file system that manages data stored and deleted from the storage media implemented in relation to the device. Further, the UMCS may include a JAVA application tailored for controlling a cellular telephone. This JAVA application would allow a cellular telephone to wirelessly control the UMCS and utilize the UMCS as its storage/portable PVR. In some cases, the JAVA application may include DVB tuners that allow for data from the cellular telephone to be piped directly to the storage media through Bluetooth. Such an application may utilize compression to fit the transfer bandwidth to an acceptable bandwidth of the UMCS.

Based on the disclosure provided herein, one of ordinary skill in the art will recognize that different variants of UMCS devices in accordance with one or more embodiments of the present invention may be developed and deployed. For example, some embodiments of the present invention provide a UMCS device that includes a wireless storage capability. Such a wireless storage capability may consist of a hard disk drive operated under the direction of an ARM processor that is accessible via, for example, an 802.11g/n compliant wireless network. Based on the disclosure provided herein, one of ordinary skill in the art will recognize that other network protocols such as, for example, WIMAX, UWB, Bluetooth, and/or the like may also be implemented in relation to one or more embodiments of the present invention. The software may be implemented such that the UMCS is capable of binding to and interacting with a number of different devices that operate the Windows CE operating system. The only interface is a battery status indicator and a wireless interface allowing for configuration by a bound device. More advanced UMCS devices may include media encoding/decoding services implementing multiple algorithms and may include a more sophisticated user interface with, for example, record and playback buttons. The user interface may be even further advanced to include an LCD. Yet more advanced UMCS devices may include backup, archiving and synchronization capability making the UMCS operate very simply as an extension of another device. The UMCS may have advanced software capable of managing expired content objects, providing Internet access and firewall capability. Further, in some cases, the UMCS device may include U3 capability. Based on the disclosure provided herein, one of ordinary skill in the art will recognize other features that may be included with different embodiments of the present invention.

Figure 6:
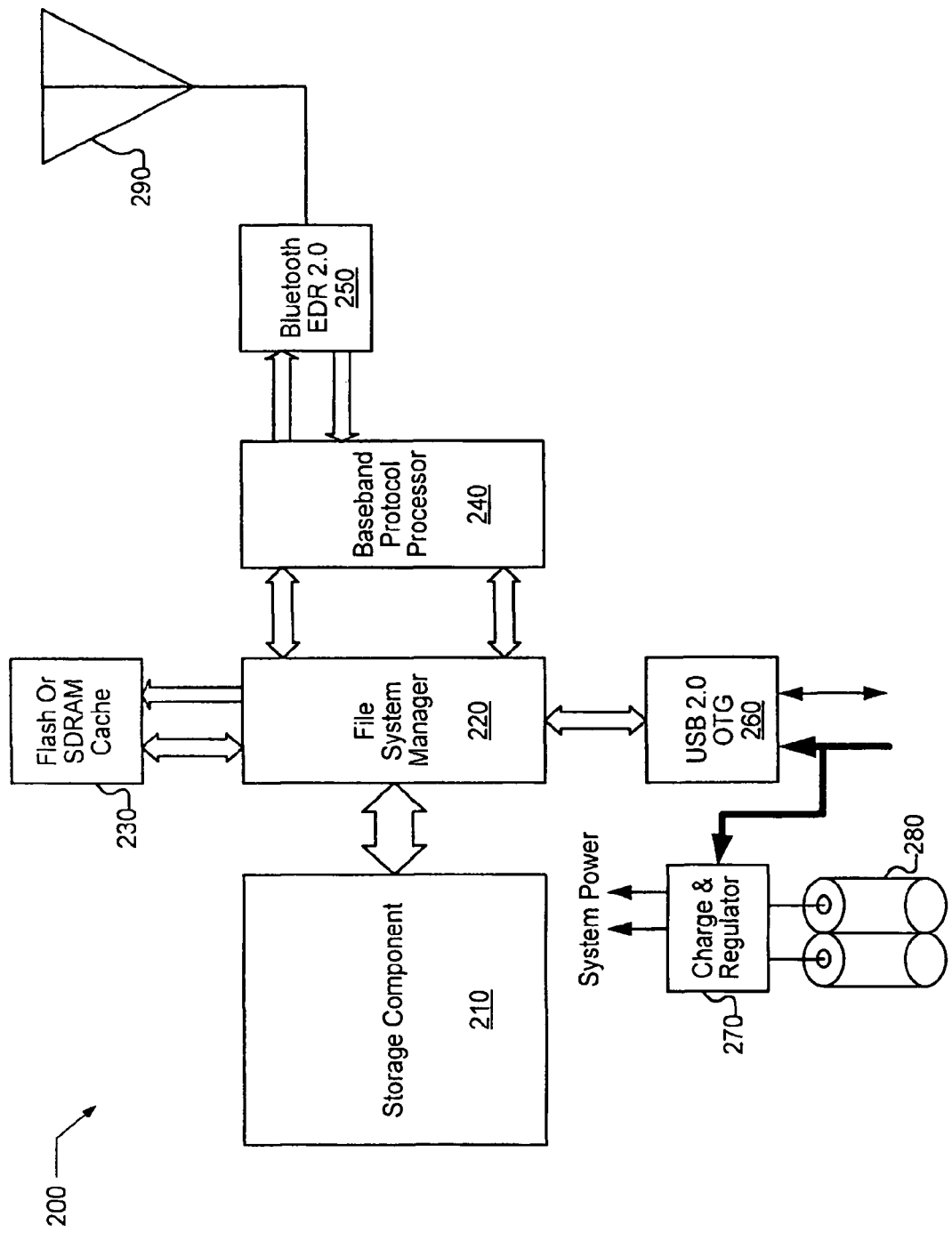
FIG. 6 is a block diagram of a UMCS device including a Bluetooth wireless communication interface in accordance with various embodiments of the present invention.

Turning to FIG. 6, an exemplary UMCS 200 in accordance with some embodiments of the present invention is depicted. As shown, UMCS 200 includes a storage component 210. Storage component 210 may be, but is not limited to, a hard disk drive, a block of flash memory, and InPhase Holographic memory, Random Access Memory, combinations of the aforementioned, and/or the like. Based on the disclosure provided herein, one of ordinary skill in the art will recognize other memory types that may be utilized in accordance with various embodiments of the present invention. UMCS 200 further includes a file system manager 220 that is operable to control reads from and writes to storage component 210. UMCS 200 includes a Bluetooth™ wireless interface. Bluetooth™ wireless interfaces provide for short-range communications intended to replace the cables connecting portable and/or fixed electronic devices. The key advantages of Bluetooth™ wireless interfaces are robustness, low power, and low cost. A typical Bluetooth™ interface includes an antenna 290 that operates as an RF transceiver, a baseband protocol processor 240, and a Bluetooth™ enhanced data rate PHY 250. A Bluetooth™ interface offers services that enable the connection of Bluetooth™ enabled devices, and the exchange of a variety of data classes between the connected devices. The Bluetooth™ interface includes one or more Bluetooth ports and software/firmware that allows UMCS 200 to operate as a hub/router for all connections in and out of storage component 210, and as more fully described below, as a hub/router for a variety of connected Bluetooth™ devices that may or may not interact with storage component 210. UMCS 200 may also be configured via the above mentioned Bluetooth™ interface.

UMCS 200 also includes a flash or SDRAM cache 230 that may be used to reduce latency in accessing storage component 210. Where storage component 210 is implemented in Flash or SDRAM, cache 230 may be eliminated. Yet further, UMCS 200 includes a USB port 260 that allows for access to storage component 210 and/or configuration of UMCS 200. UMCS 200 may also include a power controller 270 and a mobile power source 280. Baseband protocol processor 240 may include ports and software/firmware that allows it to operate as a hub/router for all connections in and out of storage component 210.

In some embodiments of the present invention, UMCS 200 is augmented to include a multiport Bluetooth™ router. Such a multiport Bluetooth™ router allows for the cross connect of a number of Bluetooth™ devices. This can be particularly useful where a number of single port Bluetooth™ devices are to be used together in an overall system. Thus, as just one example, a typical cellular telephone includes a Bluetooth™ interface capable of connecting to a single Bluetooth™ device at a time. This interface has traditionally been used to transfer audio data to/from a single a headset. It may be desirable, however, to not only transfer audio data to/from a headset, but to also provide an audio output to a car stereo, and to receive dialing information from a personal digital assistant. Such a configuration is not practical as the above mentioned cellular telephone can only support one single Bluetooth™ connection at a time, and changing between devices connected via the single Bluetooth™ port is cumbersome. Where the multiport Bluetooth™ router is incorporated into UMCS 200, UMCS 200 may be connected to the cellular telephone via one Bluetooth™ protocol interface supported by UMCS 200, and that Bluetooth™ protocol interface may be cross connected to one or more other Bluetooth™ protocol interfaces that are in turn connected to respective Bluetooth™ devices. This allows for practical implementation the above mentioned exemplary configuration involving the cellular telephone, car stereo and personal digital assistant. Among other things, such an approach offers an advantage in a wireless communications market skewing toward low-priced, basic-featured cellular telephones. Based on the disclosure provided herein, one of ordinary skill in the art will recognize other applications for multiport Bluetooth™ routers in accordance with one or more embodiments of the present invention. Further, it should be noted that while multiport Bluetooth™ routers in accordance with various embodiments of the present invention may be incorporated with a UMCS device, other embodiments of the present invention provide multiport Bluetooth™ routers that do not include one or more features of a UMCS device as described herein.

Figure 7:
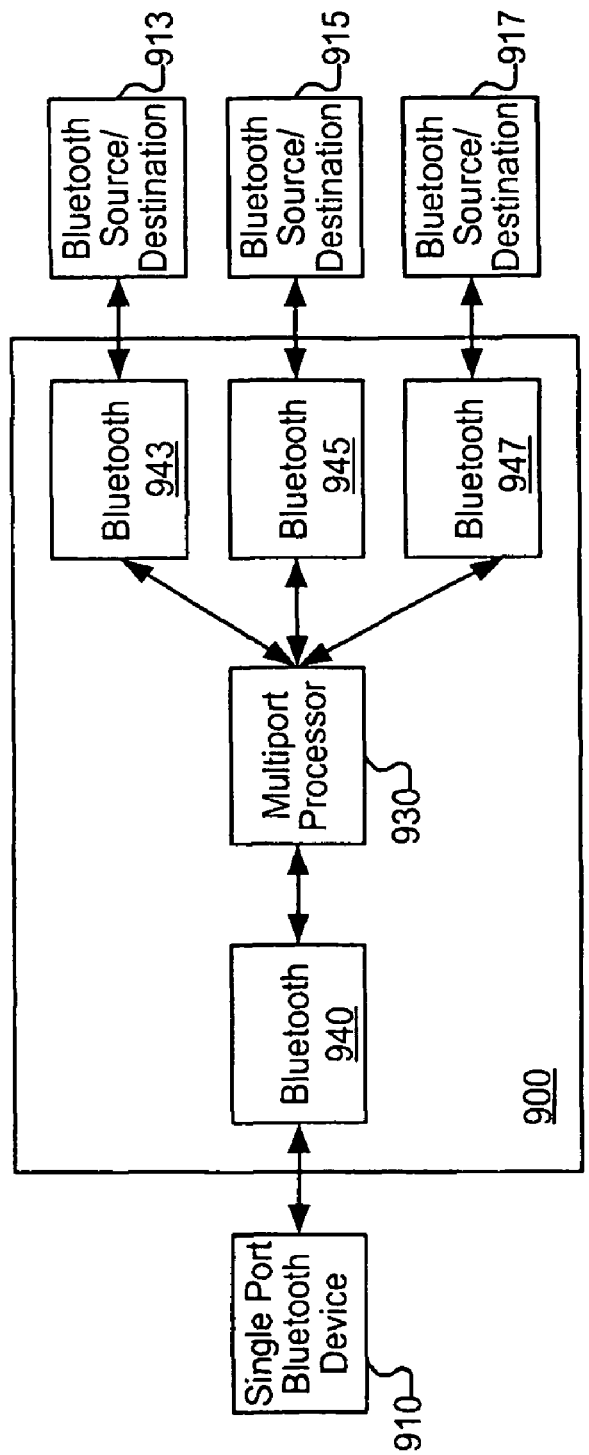
FIG. 7 shows a multiport Bluetooth data distribution system in accordance with some embodiments of the present invention.

Turning to FIG. 7, a multiport Bluetooth™ router 900 in accordance with one or more embodiments of the present invention is depicted. As previously discussed, multiport Bluetooth™ router 900 may be integrated into a UMCS device, or may be implemented as a stand alone router device. Multiport Bluetooth™ router 900 includes a number of Bluetooth™ pipes 940, 943, 945, 947 that are each coupled to a multiport processor 930. Each of the Bluetooth™ pipes includes a Bluetooth™ protocol interface that allows for the transfer of data two/from a connected Bluetooth™ device. For example, Bluetooth™ pipe 943 is communicably coupled to a Bluetooth™ source/destination 913. As used herein, a "Bluetooth™ source/destination" is any device that is capable of transferring data to and/or from another Bluetooth™ device. Similarly, Bluetooth™ pipe 945 is communicably coupled to a Bluetooth™ source/destination 915, and Bluetooth™ pipe 947 is communicably coupled to a Bluetooth™ source/destination 917. Bluetooth™ pipe 940 is communicably coupled to a Single Port Bluetooth™ device 910. As used herein, a "single port Bluetooth™ device" is any device that supports connection with only one other Bluetooth™ device at a time. An example of such a single port device is a low cost cellular telephone that is implemented with only a single Bluetooth™ port. As will be appreciated by one of ordinary skill in the art upon reading this disclosure, low cost single port Bluetooth™ devices may be extended to function as multiport Bluetooth™ devices where a stand alone multiport Bluetooth™ router/hub is used in concert with the single port device. Further detail regarding a variety of multiport Bluetooth™ functionality that may be incorporated into one or more embodiments of the present invention is found in the application entitled "Systems and Methods for Multiport Communication Distribution" that was previously incorporated herein by reference for all purposes.

The various systems and methods for data storage and acquisition may be used in relation to a large number of use scenarios. For example, various hands free environments may utilize one or more wireless memory devices. Examples of such user scenarios are more fully discussed in the application entitled "Systems and Methods for Utilizing a Wireless Storage Device" that was previously incorporated herein by reference for all purposes.

In conclusion, the present invention provides novel systems, devices, methods and arrangements for mobile data storage and acquisition. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A mobile data acquisition and distribution device, the device comprising:
a memory system, wherein the memory system includes:
a non-volatile storage medium;
a wireless interface;
a processor, wherein the memory system includes instructions executable by the processor to:
receive a user data set;
store the user data set to the non-volatile storage medium;
receive a request initiated through a remote user interface by a first directing device via the wireless interface to provide the user data set to a recipient device, wherein the recipient device is distinct from the directing device; and
provide the user data set to the recipient device via the wireless interface; and
wherein at least the non-volatile storage medium and the processor are enclosed in a case including a limited input/output functionality, wherein the limited input/output functionality includes three or fewer switches; and wherein the non-volatile storage medium and the processor receive power from a power source in the case.

2. The device of claim 1, wherein one of the three or fewer switches is a power button.

3. The device of claim 1, wherein one of the three or fewer switches is an on/off switch for a transmitter associated with the wireless interface.

4. The device of claim 1, wherein the recipient device is a mobile application device, wherein the remote user interface is a graphical user interface integrated with the mobile application device, and wherein the instructions are further executable by the processor to:
provide a menu list to the graphical user interface.

5. The device of claim 1, wherein the recipient device is a first mobile application device, wherein the remote user interface is a graphical user interface integrated with a second mobile application device, and wherein the instructions are further executable by the processor:
provide a menu list to the graphical user interface.

6. The device of claim 1, wherein the recipient device is a mobile application device, and wherein the mobile application device is selected from a group consisting of: an audio player, a video player, a combination audio and video player, and a cellular telephone.

7. The device of claim 1, wherein the recipient device is a cellular telephone, wherein the cellular telephone includes a graphical user interface, and wherein the memory system includes instructions executable by the processor to utilize the graphical user interface operates as a remote graphical user interface for the mobile storage device.

8. The device of claim 1, wherein the wireless interface is a Bluetooth interface.

9. The device of claim 1, wherein the non-volatile storage medium includes a hard disk drive.

10. The device of claim 1, wherein the non-volatile storage medium includes a flash memory.

11. A system for maintaining and distributing reusable content objects, the system comprising:
a first mobile application device, wherein the first mobile application device includes a first processor and a graphical user interface, and wherein the first processor is operable to utilize a user data set in a particular application; and
a mobile storage device, wherein the mobile storage device is communicably coupled to the mobile application device via a wireless interface, wherein the mobile storage device includes a memory system including a non-volatile storage medium and a second processor, and wherein the memory system includes instructions executable by the second processor to:
receive a request from the first mobile application device to transfer the user data set from a second mobile application device to the non-volatile storage medium;
transfer the user data set from the second mobile application device;
store the user data set in the non-volatile storage medium;

receive a request to update the graphical display to indicate the user data set; and provide a graphical display update to the mobile application device via the wireless interface.

12. The system of claim 11, wherein the system further comprises:

a graphical user interface, wherein the graphical user interface is incorporated into the mobile application device, and wherein the graphical user interface operates as a remote graphical user interface for the mobile storage device.

13. The system of claim 11, wherein the memory system includes instructions further executable by the processor to:

receive the user data set from an identified source, wherein the identified source is different from the mobile data storage device and the mobile application device.

14. The system of claim 11, wherein the mobile application device is selected from a group consisting of: an audio player, a video player, and a cellular telephone.

15. The system of claim 11, wherein the wireless interface is a Bluetooth interface.

16. The system of claim 11, wherein the non-volatile storage medium includes a hard disk drive.

17. The system of claim 11, wherein the non-volatile storage medium includes a flash memory.

18. The system of claim 11, wherein the memory system further includes instructions executable by the second processor to identify the mobile application device and initiate communications with the mobile application device via the wireless network.

19. The system of claim 18, wherein initiating communications with the mobile application device includes causing a connection request to display on the graphical user interface.

20. The system of claim 18, wherein the memory system further includes instructions executable by the second processor to:

provide a menu of data available on the storage medium to the graphical interface of the mobile application device via the wireless interface;

receive a request indicating an item from the menu of data available; and provide the item to the mobile application device;

receive a control direction from the mobile application device; and execute the control direction.

21. The mobile storage device of claim 20, wherein the control direction identifies a data set on the storage medium and a recipient of the data set, and wherein the processor is further operable to execute instructions that cause the mobile storage device to:

retrieve the identified data set from the storage medium; and provide the identified data set to the recipient via the wireless interface.

22. The mobile data storage device of claim 21, wherein the mobile application device is a first mobile application device, and wherein the recipient is a second mobile application device.

23. The system of claim 18, wherein the memory system further includes instructions executable by the second processor to:

provide a menu of operations available on the storage medium to the graphical interface of the mobile application device via the wireless interface;

receive a request indicating an item from the menu of operations available; and execute an operation indicated by the request indicating an item from the menu of operations available.

24. The system of claim 23, wherein the operation is selected from a group consisting of: controlling a data transfer between the mobile storage device and another mobile application device, and controlling connection of the mobile storage device with another mobile application device.

25. The system of claim 11, wherein the mobile storage device is powered using a third power source that is distinct from a first power source of the first mobile application device and a second power source of the second mobile application device.

* * * * *